US008891352B2

(12) United States Patent
Zou

(10) Patent No.: US 8,891,352 B2
(45) Date of Patent: Nov. 18, 2014

(54) DATA TRANSMISSION AND RECEIVING METHOD AND APPARATUS

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 13/421,464

(22) Filed: Mar. 15, 2012

(65) Prior Publication Data

US 2012/0176990 A1 Jul. 12, 2012

Related U.S. Application Data

(63) Continuation of application No. PCT/CN2010/076663, filed on Sep. 7, 2010.

(30) Foreign Application Priority Data

Sep. 15, 2009 (CN) .......................... 2009 1 0172173

(51) Int. Cl.
*H04J 11/00* (2006.01)
*H04L 5/00* (2006.01)
*H04L 27/26* (2006.01)
*H04J 14/02* (2006.01)

(52) U.S. Cl.
CPC ............ *H04L 5/0007* (2013.01); *H04L 5/0037* (2013.01); *H04L 27/2602* (2013.01); *H04L 27/2628* (2013.01); *H04L 27/265* (2013.01); *H04J 14/0204* (2013.01); *H04J 14/0212* (2013.01)
USPC ........... 370/208; 370/344; 370/329; 370/210; 370/468; 398/140

(58) Field of Classification Search
USPC .......................................... 398/140
See application file for complete search history.

(56) References Cited

U.S. PATENT DOCUMENTS

2003/0167954 A1* 9/2003 Baumgartner et al. ....... 102/510
2007/0009061 A1 1/2007 Kaku et al.
2009/0092090 A1* 4/2009 Beems Hart et al. ......... 370/329

(Continued)

FOREIGN PATENT DOCUMENTS

CN 1909536 A 2/2007
CN 101043493 A 9/2007

(Continued)

OTHER PUBLICATIONS

Extended European Search Report issued in corresponding European Patent Application No. 10816670.3, mailed Jul. 24, 2012.

(Continued)

*Primary Examiner* — Duc C Ho
(74) *Attorney, Agent, or Firm* — Brinks Gilson & Lione

(57) ABSTRACT

A data transmission method is disclosed in the present invention, where the method includes: mapping a data stream to be transmitted to an orthogonal frequency division multiplexing access, OFDMA, sub-carrier; scheduling the OFDMA sub-carrier; multiplexing the OFDMA sub-carrier to generate an OFDMA frame; and transmitting the OFDMA frame. A data transmission apparatus and a data receiving apparatus are also disclosed in the present invention. Through the present invention, a cross connection capability on the basis of the OFDMA sub-carrier is implemented, and in this way, not only all convergence services from a slave node to a master node are supported, but also a private line connection between two slave nodes is supported.

21 Claims, 7 Drawing Sheets

(56) References Cited

U.S. PATENT DOCUMENTS

| | | | |
|---|---|---|---|
| 2011/0103406 A1* | 5/2011 | Cai et al. | 370/480 |
| 2012/0061470 A1* | 3/2012 | Marguerettaz et al. | 235/454 |
| 2012/0230693 A1* | 9/2012 | Zou | 398/66 |

FOREIGN PATENT DOCUMENTS

| | | |
|---|---|---|
| CN | 101047683 A | 10/2007 |
| CN | 101248619 A | 8/2008 |
| CN | 101282188 A | 10/2008 |
| WO | WO 2009/052420 A2 | 4/2009 |

OTHER PUBLICATIONS

Qian et al., "A Novel OFDMA-PON Architecture With Source-Free ONUs for Next-Generation Optical Access Networks" IEEE Photonics Technology Letters vol. 21, No. 17, Sep. 1, 2009.

So-In et al., "Scheduling in IEEE 802.16e Mobile WiMAX Networks: Key Issues and a Survey" IEEE Journal on Selected Areas in Communications vol. 27, No. 2, Feb. 2009.

Wei et al., "Optical Orthogonal Frequency Division Multiple Access Networking for the Future Internet" J. Opt. Commun. Netw. vol. 1, No. 2, Jul. 2009.

Zheng et al., "OFDMA System with Dynamic Bandwidth Allocation in Passive Optical Networks" IEEE 2009.

International Search Report and Written Opinion of the International Searching Authority issued in corresponding PCT Patent Application No. PCT/CN2010/076663, mailed Dec. 16, 2010.

Search Report issued in corresponding Chinese Patent Application No. 2009101721730, dated Dec. 6, 2012.

Office Action issued in corresponding Chinese Patent Application No. 2009101721730, mailed Dec. 14, 2012.

Office Action issued in corresponding European Application No. 10816670.3, mailed Apr. 9, 2013.

* cited by examiner

DATA TRANSMISSION AND RECEIVING METHOD AND APPARATUS

CROSS-REFERENCE TO RELATED APPLICATIONS

This application is a continuation of International Application No. PCT/CN2010/076663, filed on Sep. 7, 2010, which claims priority to Chinese Patent Application No. 200910172173.0, filed on Sep. 15, 2009, both of which are hereby incorporated by reference in their entireties.

FIELD OF THE INVENTION

The present invention relates to the field of communications technologies, and in particular, to a data transmission and receiving method and apparatus.

BACKGROUND OF THE INVENTION

OFDM (Orthogonal Frequency Division Multiplexing, orthogonal frequency division multiplexing) belongs to FDM (Frequency Division Multiplexing, frequency division multiplexing) technologies. In an OFDM system, in order to maximize the spectrum efficiency, sub-carriers have overlapping portions. Generally, the adjacent channels with the overlapping portions may interfere with each other. However, in the OFDM system, the sub-carriers are precisely orthogonal with each other, and a maximum value point of the power of each sub-carrier directly corresponds to a minimum value point of the power of the adjacent channel, so the sub-carriers can partially overlap each other without mutual interferences. Therefore, through the OFDM system, the interference between the adjacent channels is avoided, and meanwhile, the spectrum efficiency is maximized. Since a channel transmission rate is increased with the increase of a channel bandwidth, compared with a common FDM system, the OFDM system allows higher data throughput, and the spectrum is more effectively used.

The OFDM system uses the digital signal processing technologies, and generation and receiving of each sub-carrier are completed through a digital signal processing algorithm, including IFFT (Inverse Fast Fourier Transform, inverse fast Fourier transform) and FFT (Fast Fourier Transform, fast Fourier transform), which greatly simplifies the system structure. Meanwhile, in order to improve spectrum utilization ratio, the spectrums on the sub-carriers overlap each other, and the spectrums meet orthogonality in a whole symbol period, which ensures that a receiving end may recover signals without distortion.

A baseband signal u(t) is defined, and an expression thereof is as follows:

$$S_B(t) = \text{Re}[u(t)]$$

$$u(t) = \sum_{n=0}^{N-1} d_n \cdot e^{j2\pi n f_0 t},$$

$$d_n = a_n + jb_n;$$

N sampling is implemented in a period T, and the following is obtained:

$$u\left(\frac{k}{Nf_0}\right) = \sum_{n=0}^{N-1} d_n \cdot e^{j2\pi n f_0 \frac{k}{Nf_0}} = \sum_{n=0}^{N-1} d_n \cdot e^{j\frac{2\pi nk}{N}} = \sum_{n=0}^{N-1} d_n \cdot \left(e^{j\frac{2\pi}{N}}\right)^{nk},$$

$$(k = 0, 1, 2, \ldots, N-1)$$

$$u(k) = IFFT(d_n) = IFFT(a_n + jb_n).$$

The foregoing description is an OFDM modulation process, that is, an IFFT/IDFT (Inverse Discrete Fourier Transform, inverse discrete Fourier transform) algorithm process.

The OFDM modulation process is an FFT/DFT (Discrete Fourier Transform, discrete Fourier transform) process:

$$u(t) = s_I(t) + js_Q(t) = \sum_{n=0}^{N-1} d_n \cdot e^{j2\pi n f_0 t}$$

$$d_n = FFT(u(k)).$$

The OFDM is the core technology of radio 4 G LTE (Long Term Evolution, Long Term Evolution), and applications of the OFDM to an optical network field is one of the technology hotspots in the industry. The OFDM is originally applied in a high-rate transmission system to improve the chromatic dispersion resistance of the system. Currently, applications of the OFDM technology in an optical network, or applications of the OFDM in a ring network, are also a latest technology hotspot.

In the prior art, a transmission network implemented by using an OFDMA (Orthogonal Frequency Division Multiplexing ACCESS, orthogonal frequency division multiplexing access) technology is provided. In the transmission network, the OFDMA technology and a ROADM (Reconfigurable Optical Add-drop Multiplexer, reconfigurable optical add-drop multiplexer) technology are integrated and applied in an access environment, and the ring network replaces a tree network of a current passive optical network. In a ring network, each network node allocates the loop bandwidth according to the number of the OFDM sub-carriers, and transmitting wavelengths of each node are G.692 wavelengths different from each other. All the nodes share a same OFDMA frame, and different wavelengths are superposed with each other. An optical receiver in the node is a multi-wavelength receiver, which receives all the wavelengths at the same time, and a tributary card of the receiver has functions required by the OFDMA, such as digital signal processing (IFFT/FFT), AD (analog-digital)/DA (digital-analog) conversion, M-QAM (M-Quadrature Amplitude Modulation, M-quadrature amplitude modulation) encoding/decoding, and port data traffic monitoring. A downlink OFDMA signal transmitted from a master node, OLT (Optical Line Terminal, optical line terminal), to a destination ONU (Optical Network Unit, optical network unit) in two loop directions reaches the ONU, and then reaches an 2×1 selective optical switch through a SPLITTER (splitter), and afterwards reaches an AD converter in the ONU for being converted into a digital signal, and then a data signal is restored through digital down conversion, FFT processing and M-QAM decoding processes. A downlink processing process of the ONU requires authorization of the OLT, and then the allocated OFDMA sub-carriers can be DROP DWON (dropped down). An uplink of the ONU initiates a bandwidth request to the OLT by monitoring the data traffic in a buffer, and the OLT calculates an allocation result through a bandwidth allocation algorithm after receiving all the bandwidth requests of the ONU, and then transmits a bandwidth authorization signal to the ONUs.

A frame structure on the ring network is a TDD (Time Division Duplex, time division duplex) manner, that is, the uplink and the downlink form a large frame which is divided into an uplink sub-frame and a downlink sub-frame on the time, and the uplink frame uses a two-dimensional frame structure manner of OFDMA and TDMA (Time Division Multiple Access, time division multiple access), and is divided into time slots with 125 μs as a unit. An uplink burst packet is loaded in each time slot, a format of which is similar to the format of the uplink burst packet in a GPON (Gigabit-Capable Passive Optical Network).

Another OTN (Optical Transport Network, optical transport network) technology is further provided in the prior art, and OTN-series recommendations, such as ITU-T G.709, G.798 and G.87X, formulated by the ITU-T (International Telecommunications Union-Telecommunications Standardization section, International Telecommunications Union-Telecommunications Standardization section) are already mature, and are commercially used in the OTN products in the industry. The main task of the OTN is to digitally encapsulate and transmit client signals with a rate higher than 1 G, the minimum cross scheduling granularity thereof is at a 1 G level, and the common cross scheduling granularity is at a 1 G/2.5 G/10 G level.

During the implementation of the present invention, the inventor finds that the prior art at least has the following problems.

1. Only all the convergence services from the slave node to the master node are supported, while private line connection between two slave nodes is not supported.

2. The channel granularity is rough, and the services with the rate higher than 1 GBIT/S may be scheduled, while the sub-rate services with the rate lower than 1 G cannot be flexibly scheduled. However, scheduling requirements based on the stream still exist on a backbone network, and the rates of the streams are variable and are lower than 1 G for example, an HDTV video stream or a 155 MBIT/S data stream.

3. The improvement is performed on the basis of a transmission technology system, and the application of the OFDM technology is limited on a WDM ring network, without consideration of the relation to and integration with the conventional transmission system.

4. Since the multiple wavelengths share one OFDMA frame, the loop capacity has no relation to the number of the wavelengths, and the capability of a large capacity of the multi-wavelength network cannot be reflected.

SUMMARY OF THE INVENTION

An embodiment of the present invention provides a data transmission method, for implementing connection between any nodes through scheduling of an OFDMA sub-carrier. The method includes:

mapping a data stream to be transmitted to an orthogonal frequency division multiplexing access, OFDMA, sub-carrier;

scheduling the OFDMA sub-carrier;

multiplexing the OFDMA sub-carrier to generate an OFDMA frame; and transmitting the OFDMA frame.

An embodiment of the present invention further provides a data receiving method, for implementing connection between any nodes through scheduling of an OFDMA sub-carrier. The method includes:

receiving an OFDMA frame;

performing digital filtering processing on the OFDMA frame to obtain an OFDMA sub-carrier;

scheduling the OFDMA sub-carrier; and demapping the OFDMA sub-carrier to restore an original data stream, and transmitting the original data stream to a user network.

An embodiment of the present invention further provides a data transmission apparatus, for implementing connection between any nodes through scheduling of an OFDMA sub-carrier. The apparatus includes:

a tributary unit, configured to map a data stream to be transmitted to an OFDMA sub-carrier;

a cross unit, configured to schedule the OFDMA sub-carrier from the tributary unit to a line unit;

the line unit, configured to perform multiplexing processing on the OFDMA sub-carrier to generate an OFDMA frame, and transmit the OFDMA frame.

An embodiment of the present invention further provides a data receiving apparatus, for implementing connection between any nodes through scheduling of an OFDMA sub-carrier. The apparatus includes:

a line unit, configured to receive an OFDMA frame, and perform digital filtering processing on the OFDMA frame to obtain an OFDMA sub-carrier;

a cross unit, configured to schedule the OFDMA sub-carrier from the line unit to a tributary unit; and the tributary unit, configured to perform demapping processing on the OFDMA sub-carrier to restore an original data stream, and transmit the original data stream to a user network.

In the embodiments of the present invention, the data stream to be transmitted is mapped to the OFDMA sub-carrier; the OFDMA sub-carrier is scheduled; the OFDMA sub-carrier is multiplexed to generate the OFDMA frame; and the OFDMA frame is transmitted. Different from the OFDMA frame being superposed in an optical domain on the basis of multi-wavelength in the prior art, the OFDMA frame is processed on the basis of an electric layer, and the multiplexing of the sub-carrier or a channel is performed at the electric layer, which thereby implements a cross connection capability on the basis of the OFDMA sub-carrier, and in this way, not only all convergence services from a slave node to a master node are supported, but also a private line connection between two slave nodes is supported.

In the embodiments of the present invention, the OFDMA frame is received; the digital filtering processing is performed on the OFDMA frame to obtain the OFDMA sub-carrier; the OFDMA sub-carrier is scheduled; and the OFDMA sub-carrier is demapped to restore the original data stream, and the original data stream is transmitted to the user network. Different from the OFDMA frame being superposed in an optical domain on the basis of multi-wavelength in the prior art, the OFDMA frame is processed on the basis of an electric layer, and the demultiplexing of the sub-carrier or a channel is performed at the electric layer, which thereby implements a cross connection capability on the basis of the OFDMA sub-carrier, and in this way, not only all convergence services from a slave node to a master node are supported, but also a private line connection between two slave nodes is supported.

BRIEF DESCRIPTION OF THE DRAWINGS

To illustrate the technical solutions in the embodiments of the present invention or the prior art more clearly, accompanying drawings required to be used in the description of the embodiments and the prior art are simply introduced below.

Apparently, the accompanying drawings described below are only some of the embodiments of the present invention. According to the accompanying drawings, those of ordinary skill in the art may obtain other accompanying drawings without making creative efforts. In the accompanying drawings.

DETAILED DESCRIPTION OF THE EMBODIMENTS

In order to make the objectives, technical solutions, and advantages of the present invention more comprehensible, the embodiments of the present invention is further illustrated in detail below with reference to the accompanying drawings. Here, the exemplary embodiments and the illustrations of the present invention are only intended to explain the present invention, rather than to limit the present invention.

Figure 1:
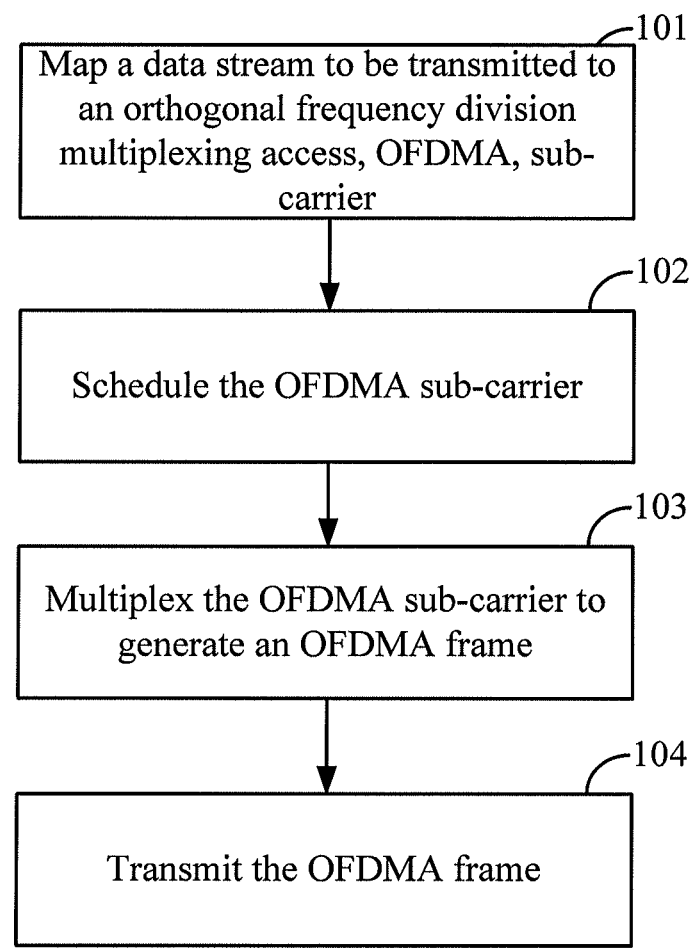
FIG. 1 is a processing flow chart of a data transmission method according to an embodiment of the present invention.

As shown in FIG. 1, in an embodiment of the present invention, a processing procedure of a data transmission method may include.

Step 101: Map a data stream to be transmitted to an OFDMA sub-carrier;

Step 102: Schedule the OFDMA sub-carrier.

Step 103: Multiplex the OFDMA sub-carrier to generate an OFDMA frame,

Step 104: Transmit the OFDMA frame.

It can be known from the procedure as shown in FIG. 1 that, in the embodiment of the present invention, the data stream to be transmitted is mapped to the OFDMA sub-carrier, the OFDMA sub-carrier is scheduled, the OFDMA sub-carrier is multiplexed to generate the OFDMA frame, and the OFDMA frame is transmitted. Different from the OFDMA frame being superposed in an optical domain on the basis of multi-wavelength in the prior art, the OFDMA frame is processed on the basis of an electric layer, and the multiplexing of the sub-carrier or a channel is performed at the electric layer, which thereby implements a cross connection capability on the basis of the OFDMA sub-carrier, and in this way, not only all convergence services from a slave node to a master node are supported, but also a private line connection between two slave nodes is supported.

In an embodiment, before the data stream to be transmitted is mapped to the OFDMA sub-carrier, a DBA (Dynamic Bandwidth Allocation, dynamic bandwidth allocation) request is initiated, bandwidth allocation information calculated according to the DBA request, service priority and bandwidth resources is received, and afterwards, the data stream to be transmitted is mapped to the OFDMA sub-carrier according to the bandwidth allocation information. Such implementation is in consideration of the following: If the transmission is in a maximum peak rate of an FE (Fast Ethernet, fast Ethernet), the allocation of the sub-carriers is fixed. However, in practice, data traffic in an FE port changes dynamically, and if the sub-carriers are allocated merely in consideration of the maximum traffic, a line bandwidth cannot be effectively used. Therefore, in order to effectively use the line bandwidth, statistical multiplexing is required for a number of FE ports.

The statistical multiplexing process in this embodiment may be implemented through the calculation of the master node. The slave node detects, according to the statistics of traffic of each tributary port, the traffic of the data stream that is to be transmitted and from a user network, and the DBA request corresponding to each port is generated according to the detected traffic, inserted into an overhead sub-carrier, and transmitted to the master node for processing. After receiving the DBA request transmitted from each network element, the master node uses the DBA algorithm to fairly allocate the bandwidths according to the DBA request, service priority and bandwidth resources, and obtains the bandwidth allocation information required by each tributary interface of each slave node network element, where the bandwidth allocation information is also referred to as a bandwidth map including information such as the amount and serial numbers of the sub-carriers, and is transmitted to each slave node. The slave nodes perform the mapping processing according to the allocated bandwidth map, map the tributary traffic, that is, the data stream to be transmitted, onto the allocated OFDMA sub-carrier, and transmit the data stream after the scheduling and multiplexing of the sub-carrier to a destination node.

It is assumed that 20 100 MBIT/S FE private lines exist, which correspond to 20 LTE base stations, the line capacity required in the data transmission is 2 GBIT/S, and a ring network formed by 4 network elements exists and includes a master node. Since in this embodiment, the DBA algorithm is implemented with the discrimination of the service priority, and the DBA algorithm does not have a convergence capability for high-priority services, and performs statistical multiplexing on the low-priority services. The convergence ratio thereof is generally 1:10 according to an application condition of an L2 exchange in a convergence network, and the convergence ratio of the DBA algorithm in this embodiment is generally set to 1:6 to 1:8 for the low-priority services in consideration of the service priority. Assuming that half of the services are the high-priority services, the convergence ratio may reach 1:3 to 1:4 on average, which indicates that 60 to 80 FE ports, that is, 60 to 80 LTE base stations, may actually access the transmission network in this embodiment.

It can be seen that, through the embodiment of the present invention, high bandwidth utilization efficiency may be implemented, that is, the transmission rate higher than 2 G can be implemented by using an optical transmitting and receiving device with a low cost, for example, GIGABIT ETHERNET (Gigabit Ethernet). With the increase of a sampling rate of an A/D converter and the development of a high-capacity, high-rate DSP (Digital Signal Processing, digital signal processing) technology, the bandwidth utilization may be further improved. The maximum sampling rate of the A/D converter provided in the industry currently is 56 GBIT/S, and the resolution thereof is 6 bits, and therefore, it is completely feasible to transmit a 10 GBIT/S data stream on a 2.5 GBIT/S optical channel, or transmit a 40 GBIT/S data stream on a 10 GBIT/S optical channel.

Since the bandwidth of the sub-carrier channel is variable, the sub-carrier is applicable for the transmission of sub-rate services in any rates, and therefore, the transmission of the 2 MBIT/S data stream of a 2 G wireless base station, to several 3 G 2 MBIT/S data streams, then to the uplink 50 MBIT/S data stream and downlink 100 MBIT/S data stream of 4 G, or 1 G GIGABIT ETHERNET may all use the sub-carrier in the embodiment of the present invention.

Additionally, the convergence capability of the DBA may bring high flexibility for the transmission bandwidth. In the foregoing embodiment, at the beginning, 20 LTE base stations share the 2 GBIT/S line rate, and through a convergence ratio 3 to 4 times of the DBA, expansion of 60 to 80 LTE base stations may be implemented. Through the convergence capability of the BDA, the problem that the modulation bandwidth or the sub-carrier interval increases linearly according to the access bandwidth is avoided, and further the problem of linear expansion of a backbone network is avoided. The convergence bandwidth further ensures QOS of services with different priorities at the same time, and prevents congestion, which reflects that the DBA improves the utilization ratio of the sub-carrier bandwidth. Furthermore, such flexibility may be well applicable to the bandwidth change of 2 G, 3 G and 4 G wireless access and fixed network broadband access, and is a desirable technology option for being applied in access and convergence environments.

In an embodiment, when the data stream to be transmitted is mapped to the OFDMA sub-carrier, it may be included that: the rate of the data stream is adapted to be consistent with a bearer rate of the OFDMA sub-carrier.

During specific implementation, the data stream that is to be transmitted and is from a user network is adapted, through an adaptation protocol, to be a data stream with the rate consistent with the bearer rate of the allocated OFDMA sub-carrier. For example, when the bearer rate of each sub-carrier is 4 MBIT/S and the rate of the transmitted client signal is 10 MBIT/S, three OFDMA sub-carriers are required, and the 10 MBIT/S data stream is required to be adapted to be one of 12 MBIT/S.

As for the services requiring transparent transmission, rate adjustment may be implemented through a positive insertion manner, so that the rate is adjusted to the rate of the allocated sub-carrier. As for other services such as FE/GE, HDTV or TDM, the rate may be adapted to be the allocated sub-carrier rate through a GFP/GEM adaptation protocol.

In an embodiment, the mapping the data stream to be transmitted to the OFDMA sub-carrier may include: performing encoding processing on the data stream, and performing IFFT processing on the encoded data stream to modulate the encoded data stream onto the OFDMA sub-carrier. The encoding processing performed on the data stream may be encoding processing such as M-QAM or QPSK.

Figure 2:
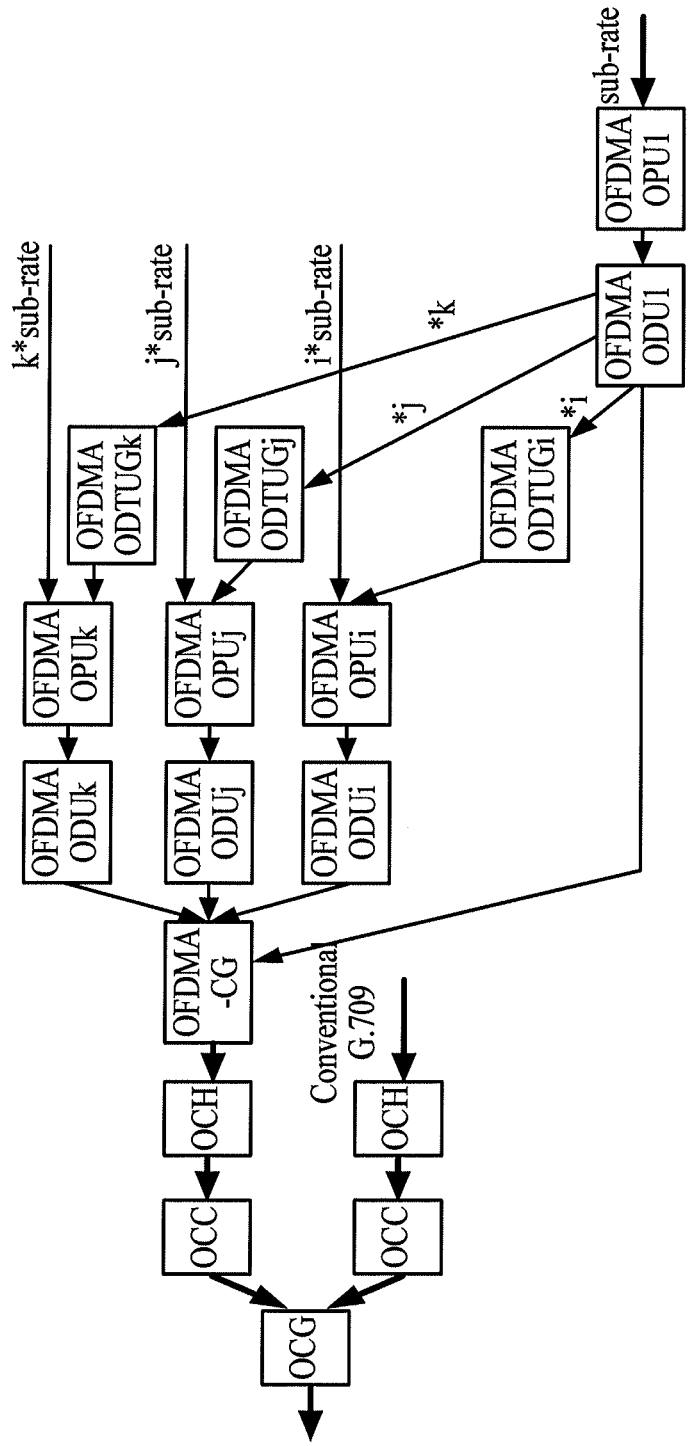
FIG. 2 is a schematic diagram of mapping and multiplexing of an OFDMA sub-carrier according to an embodiment of the present invention.

As shown in FIG. 2, during specific implementation, the mapping the data stream to be transmitted to the OFDMA sub-carrier may include: mapping the data stream to be transmitted to a payload unit of the OFDMA sub-carrier; and then mapping the payload unit of the OFDMA sub-carrier to a data unit of the OFDMA sub-carrier. During the implementation, the data stream to be transmitted may be mapped to an OFDMA-OPU1 (Optical channel Payload Unit, optical channel payload unit), which is a single sub-carrier payload unit, or the data stream to be transmitted with a rate i times faster than a sub-rate (sub-rate) is mapped to an OFDMA-OPUi after adaptation, where i is an integer, and OFDMA-OPUi indicates that the capacity of its payload region is i times larger than a OFDMA-ODU1, that is, at least i sub-carriers exist. Definitely, the data stream to be transmitted may first formed a sub-rate data stream through the previously-mentioned rate adaption, and then the mapping processing is performed.

Figure 3:
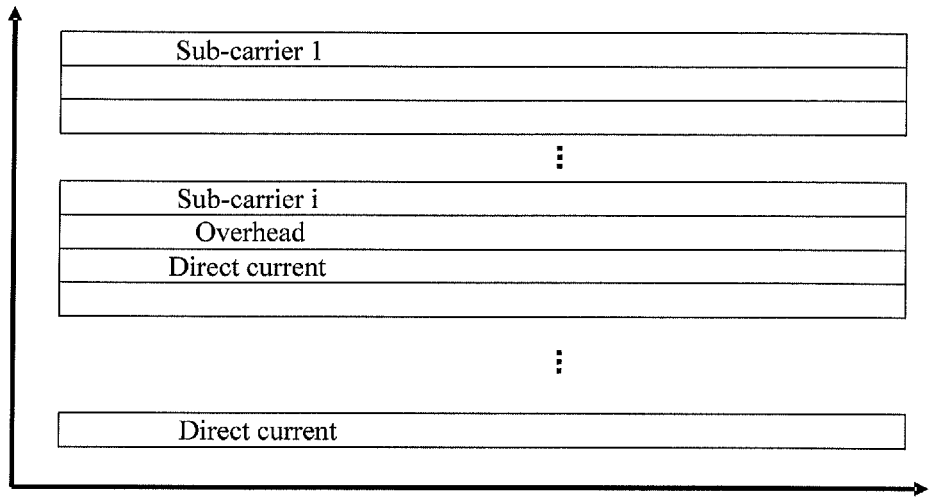
FIG. 3 is a schematic diagram of an OFDMA-ODUi format according to an embodiment of the present invention.

An OFDMA-ODUi (Optical channel Data Unit, optical channel data unit) format, that is, a sub-carrier data unit, is formed by adding an overhead sub-carrier to an OFDMA-OPUi payload sub-carrier, which is as shown in FIG. 3. When i=1, if one overhead sub-carrier is added to a single OFDMA-OPU1 payload sub-carrier, the bandwidth utilization is low, and at this time, many sub-rate services may be bound together to share one sub-carrier, or overheads are inserted into an encoding layer for management during single sub-rate service transmission. To sum up, the overhead sub-carrier may be set according to the requirements.

After the data stream to be transmitted is mapped to the OFDMA sub-carrier, and the OFDMA sub-carrier is scheduled, the multiplexing processing is performed on the OFDMA sub-carrier to generate an OFDMA frame. When the OFDMA sub-carrier is scheduled, a scheduling entity may be the OFDMA-ODUi, and a minimum scheduling granularity may be a single sub-carrier, that is, the OFDMA-ODU1. Many scheduling manners with the single OFDMA sub-carrier as the granularity exist. For example, an OFDMA sub-carrier of which an input frequency is a first frequency (for example, f1) is scheduled to an OFDMA sub-carrier of which an output frequency is the first frequency. Alternatively, the frequency of the OFDMA sub-carrier of which the input frequency is the first frequency is changed into a second frequency (f2), and then the OFDMA sub-carrier with frequency changed is scheduled to an OFDMA sub-carrier of which the output frequency is the second frequency.

In addition to the scheduling with the single OFDMA sub-carrier as the granularity, the scheduling may also be performed between OFDMA sub-carrier data units formed by the same number of OFDMA sub-carriers, that is, scheduling the OFDMA-ODUi. For example, an OFDMA sub-carrier data unit of which an input frequency band is a first frequency band (for example, B1) is scheduled to an OFDMA sub-carrier data unit of which an output frequency band is the first frequency band. Alternatively, after the frequency band of the OFDMA sub-carrier data unit of which the input frequency band is the first frequency band is changed into a second frequency band (for example, B2), and then the OFDMA sub-carrier data unit with frequency band changed is scheduled to an OFDMA sub-carrier data unit of which the output frequency band is the second frequency band. Definitely, other OFDMA sub-carrier scheduling manners may also exist during the implementation.

The single sub-carrier or channel is multiplexed into a complete OFDMA frame through the multiplexing of the sub-carrier. For example, as shown in FIG. 2, multiple OFDMA sub-carrier data units including one payload sub-carrier are multiplexed into an OFDMA sub-carrier data unit including multiple payload sub-carriers, for example, i OFDMA-ODU1s are multiplexed into an OFDMA-ODUi, and further, multiple OFDMA sub-carrier data units including multiple payload sub-carriers after multiplexing are multiplexed into an OFDMA channel group through sub-carrier superposition, for example, the OFDMA-ODUi, an OFDMA-ODUj and an OFDMA-ODUk are multiplexed into an OFDMA-CG (a channel group formed by the OFDMA sub-carriers or channels), that is, the complete OFDMA frame structure as shown in FIG. 4, where, the OFDMA-ODUi is a channel including at least i payload sub-carriers, and $1 \leq i+j+k \leq N$, N is the total number of the sub-carriers in the OFDMA frame, that is, the number N of points in the IFFT operation.

Figure 4:
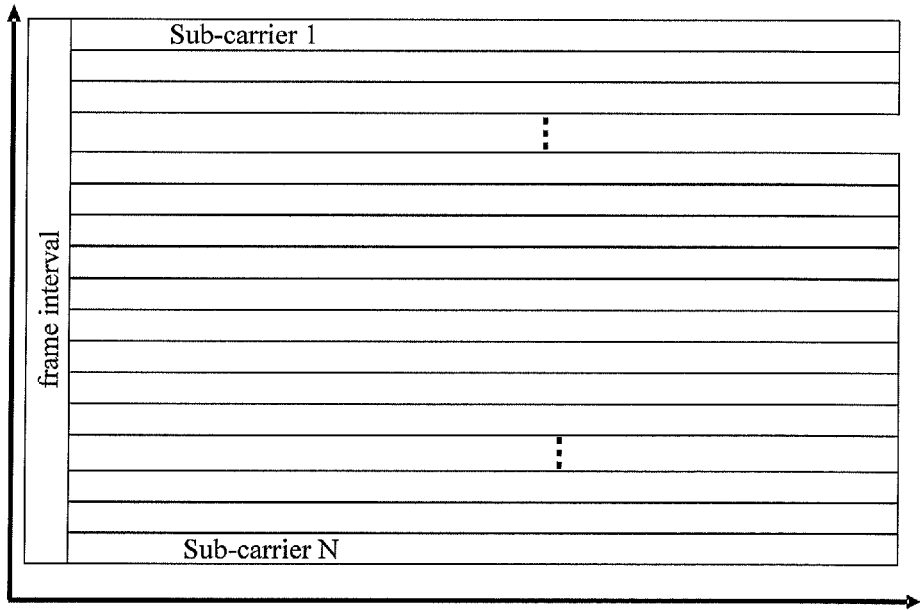
FIG. 4 is a schematic structural diagram of an OFDMA frame according to an embodiment of the present invention.

It can be known from FIG. 4 that, a line frame format includes several OFDMA sub-carriers, where some sub-carriers may be allocated for overhead transmission, and most of the sub-carriers are used for data transmission. The number of the sub-carriers may depend on the sub-carrier interval and the modulation bandwidth. For example, when the sampling frequency of the A/D converter is 2 GHz, the modulation bandwidth is half of the sampling frequency, that is, 1 GHz. Assuming that the sub-carrier interval is 1 MHz, 1000 sub-carriers are required in total. In consideration that M-QAM encoding may improve the bandwidth utilization ratio, for example, 16QAM may reach 4 BIT/Hz bandwidth utilization, in this way, 1 MHz sub-carrier may actually bear a 4 MBIT/S digital rate, that is to say, 1 GHZ modulation bandwidth may transmit a data in a 4 GBIT/S data rate.

In an embodiment, after the multiplexing processing is performed on the OFDMA sub-carrier to generate the OFDMA frame, and before the OFDMA frame is transmitted, it is further included that a cyclic prefix or a frame interval is inserted into the OFDMA frame, and D/A conversion processing is performed.

In an embodiment, the transmitting the OFDMA frame may further include: the OFDMA frame is adapted into an optical channel or a microwave channel for transmission. For example, the OFDMA frame is adapted into the OCH (Optical Channel, Optical Channel), that is, as shown in FIG. 2, the OFDM-CG is adapted into the OCH, which is the wavelength, and then forms OCG (Optical Carrier Groups, optical carrier groups) through an OCC (Optical Channel Carrier, optical channel carrier) for transmission. Therefore, in the embodiments of the present invention, further expansion may also be implemented through the expansion of the OCH.

It can be seen from FIG. 2 that, in the embodiment of the present invention, a G.709 mapping path is compatible, and the mapping path of the OFDMA sub-carrier is added to the G. 709 mapping path. It is direct modulation through which an OTUk is adapted to an OCh in the original G.709, and when the rate of the OTUk (fully standardized optical channel transport unit) reaches 40 GBIT/S or above, the direct modulation may bring great waste to an optical domain bandwidth. For example, a 50 Ghz interval is mostly used as a wavelength interval in the current WDM network, and when the rate of the OTUk is 100 Gbit/s, the direct modulation may make the optical domain bandwidth exceed one wavelength interval, and cannot be applied in the WDM network with a 50 Ghz interval accordingly. Therefore, after the foregoing M-QAM encoding and IFFT processing, the frequency utilization efficiency is improved, so that the OTUk may be still transmitted in an OCH system with a 50 Ghz interval. Therefore, the embodiment of the present invention is compatible with an OTN system at an OCH layer, and may be used as a supplement and improvement of the current OTN system, thereby improving the current OTN modulation manner and increasing the spectrum utilization efficiency. With the development of the A/D and D/A technologies and a high-speed ASIC (Application Specific Integrated Circuit, application specific integrated circuit), the embodiments of the present invention may be used as a technology option of a NG (Next Generation, next generation) OTN.

It can be seen from FIG. 2 that, the OFDMA sub-carrier and the OCH are essentially frequency domain signals and have high signal transparency for the user data stream to be transmitted. Here, the OFDMA sub-carrier signal is equivalent to an intermediate frequency modulation signal, which may be directly modulated onto an optical domain OCH (Optical Channel, optical channel) and may also be modulated onto a microwave RF (Radio Frequency, radio frequency). For example, the OFDMA baseband or intermediate frequency signal with a 500 MHZ bandwidth is directly modulated onto an E-BAND (E-band) microwave without other processing, which has more outstanding advantages over other conventional TDM (Time Division Multiplex, time division multiplex) mechanisms. Through such mechanism, the optical transmission (OCH), the wireless transmission (OFDMA) and the microwave transmission (RF) are integrated in deed to form a unified technology mechanism, where the OFDMA sub-carrier processing is the core, which greatly facilitates simplification of design of the transmission products. The integration with the wavelength of the optical layer is more applicable to the expansion of the future capacity.

Figure 5:
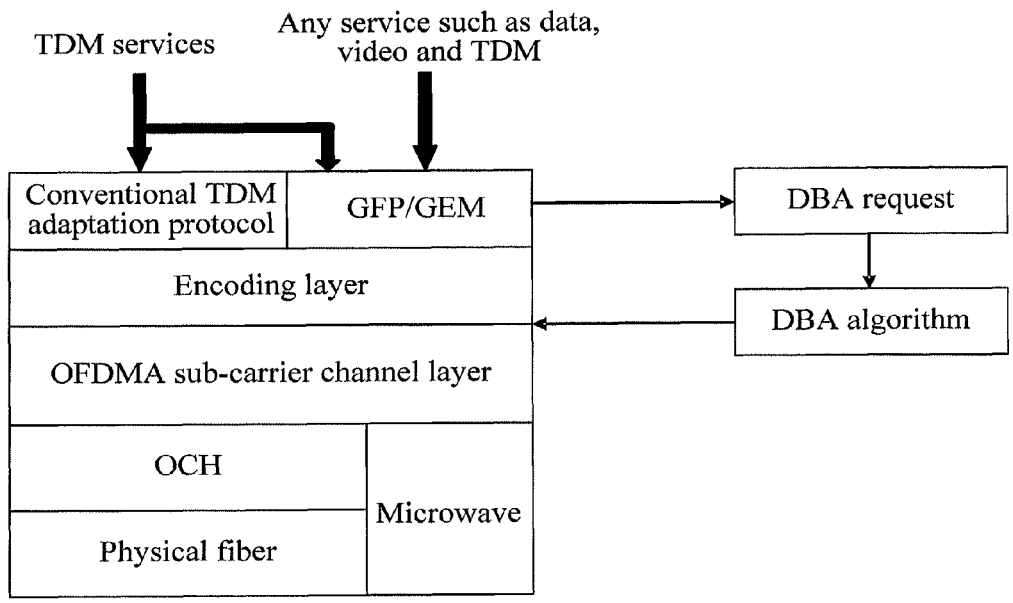
FIG. 5 is a schematic diagram of a specific example of a data transmission method according to an embodiment of the present invention.

FIG. 5 is a schematic diagram of the foregoing data transmission method according to an embodiment, and the method shown in FIG. 5 mainly includes:

Rate adaptation is performed on services such as a TDM service, data and video, that is, the rate of the data stream to be transmitted is adapted to be consistent with the bearer rate of the OFDMA sub-carrier. For example, the rate of the data stream to be transmitted is adapted to be the rate of the allocated sub-carrier through the TDM adaptation protocol or the GFP/GEM adaptation.

After the rate adaptation, the mapping the data stream to be transmitted to the OFDMA sub-carrier includes that: encoding layer processing and OFDMA sub-carrier channel layer processing is performed on the data stream. The OFDMA sub-carrier channel layer processing includes: IFFT processing is performed on the data stream after the encoding processing, and then the data stream is modulated onto the OFDMA sub-carrier; the OFDMA sub-carrier is scheduled; and multiplexing processing is performed on the OFDMA sub-carrier to generate an OFDMA frame.

Afterwards, the generated OFDMA frame is transmitted, which may include that: the OFDMA frame is adapted into the OCH for transmission through a physical fiber, or to the microwave for transmission.

In addition, FIG. 5 further illustrates a processing process of allocating bandwidths through the DBA request and the DBA calculation. That is: before the data stream to be transmitted is mapped to the OFDMA sub-carrier, the DBA request is initiated; and the bandwidth allocation information calculated according to the DBA request, the service priority and the bandwidth resources is received, and the data stream to be transmitted is mapped to the OFDMA sub-carrier according to the bandwidth allocation information.

Figure 6:
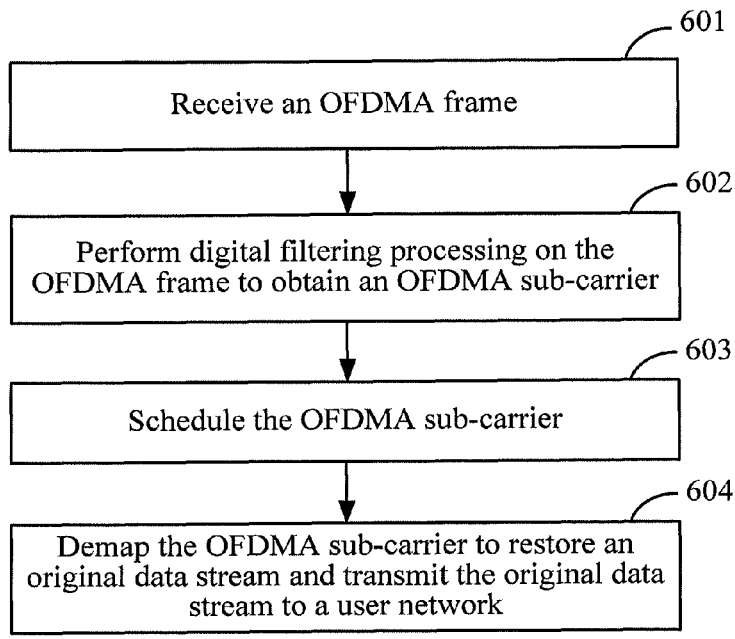
FIG. 6 is a processing flow chart of a data receiving method according to an embodiment of the present invention.

An embodiment of the present invention further provides a data receiving method, and as shown in FIG. 6, a processing process thereof may include:

Step 601: Receive an OFDMA frame.

Step 602: Perform digital filtering processing on the OFDMA frame to obtain an OFDMA sub-carrier.

Step 603: Schedule the OFDMA sub-carrier.

Step 604: Demap the OFDMA sub-carrier to restore an original data stream, and transmit the original data stream to a user network.

It can be known from the procedure shown in FIG. 6 that, in the embodiments of the present invention, the OFDMA frame is received; the digital filtering processing is performed on the OFDMA frame to obtain the OFDMA sub-carrier; the OFDMA sub-carrier is scheduled; the OFDMA sub-carrier is demapped to restore the original data stream, and the original data stream is transmitted to the user network. Different from the OFDMA frame being superposed in an optical domain on the basis of multi-wavelength in the prior art, the OFDMA frame is processed on the basis of an electric layer, and the demultiplexing of the sub-carrier or a channel is performed at the electric layer, which implements a cross connection capability on the basis of the OFDMA sub-carrier, and in this way, not only all convergence services from a slave node to a master node are supported, but also a private line connection between two slave nodes is supported.

During specific implementation, the OFDMA frame may be received through an optical channel or a microwave channel; and before the digital filtering processing is performed on the OFDMA frame, the received OFDMA frame is converted into an electric signal.

After the received OFDMA frame is converted into the electric signal, and before the digital filtering processing is performed on the OFDMA frame, the method may further include that: analog-digital conversion processing is performed; and a cycle prefix or a frame interval is removed from the OFDMA frame.

The demapping processing may include that: FFT processing is performed on the OFDMA sub-carrier; and decoding processing is performed on the OFDMA sub-carrier after the FFT processing.

Figure 7:
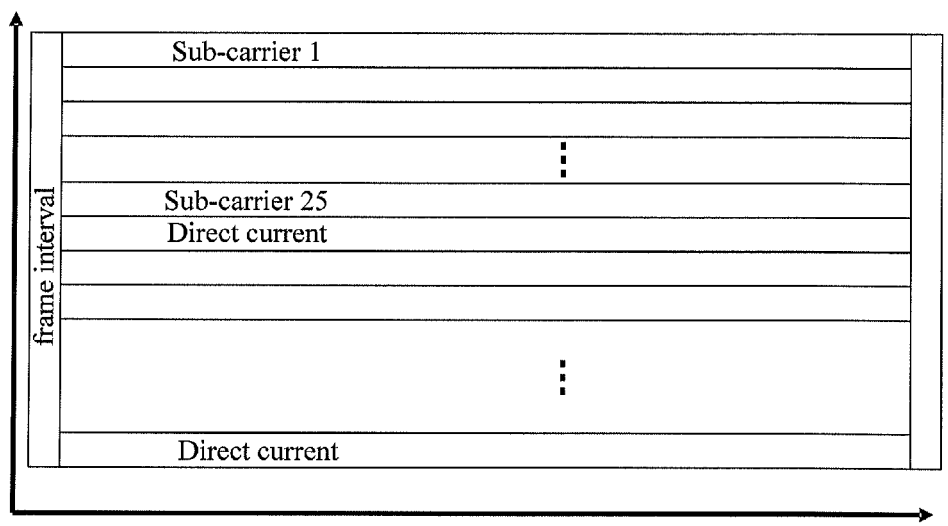
FIG. 7 is a schematic structural diagram of an OFDMA frame after digital filtering according to an embodiment of the present invention.

The digital filtering processing is that, the sub-carriers in FIG. 4 are split into single sub-carriers or several channels, where each channel includes sub-carriers more than one, for the bandwidth of some services is larger than the bandwidth capable of being borne by one sub-carrier. For example, when FE=100 Mbit/s, at least 25 sub-carriers are required for bearing. As shown in FIG. 7, assuming that the channel formed by the sub-carriers 1 to 25 is used for transmitting one FE service, and before demapping processing and the channel scheduling are performed, a signal format thereof is as shown in FIG. 7, where only the sub-carriers requiring scheduling exist, and direct streams are at other positions. When demapping is performed on the signal, the signal is further filtered to a single sub-carrier, and then undergoes QAM-decoding, and finally, is restored into a signal in a NATIVE format of the FE and is transmitted to the user network.

Figure 8:
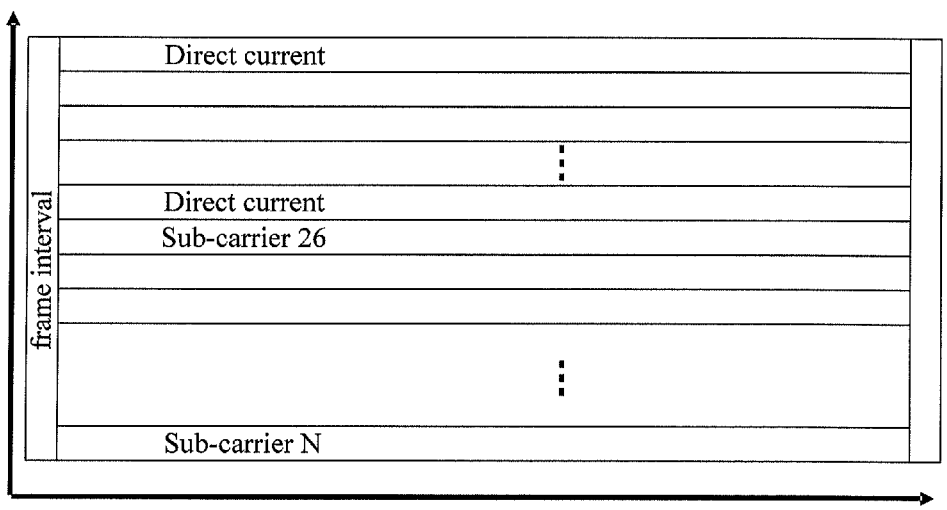
FIG. 8 is a schematic structural diagram of an OFDMA frame bypassing from a current node according to an embodiment of the present invention.

On the contrary, the multiplexing processing in the foregoing embodiment is superposing the transmitted sub-carrier or channel BYPASS (bypassing) the current node and the sub-carrier or channel ADD (added) from a tributary, where the format of the sub-carrier or channel ADD from the tributary is the same as or similar to the format of the scheduled sub-carrier or channel, for example, the superposition of FIG. 8 and FIG. 7 forms a complete OFDMA frame as shown in FIG. 4.

Since a GAP between the OFDMA frames may be removed in a receiving direction, the frame format during demapping processing is a continuous IFFT block with equal length. In an optical fiber in one direction, the transmission paths of the sub-carriers in the OFDMA frames are the same, and therefore, a delay difference between the sub-carriers does not exist. However, on a loop, the delay difference exists due to different transmission paths of the OFDMA frames in the fibers in different directions. Therefore, before the cross of the sub-carriers or the channels, multiple input OFDMA frames are adjusted to a phase of a frame inside the system through the BUFFER (buffer), which is equivalent to frame alignment processing. The processing delay required in the frame alignment is small due to a short OFDMA frame period, and therefore, the establishment delay of the cross scheduling implemented in the embodiments of the present invention is small. Specifically, since an integral period of the IFFT is not long, the period of the minimum sub-carrier in 1000 sub-carriers is 1 µs according to the calculation of 1 Ghz bandwidth. Even if multiple IFFTs share one gap to form the OFDMA frame, the period is also at a level of several microseconds, and therefore, the delay of the cross processing is small and the implementation is simple.

In an embodiment, the scheduling of the OFDMA sub-carrier may include:

An OFDMA sub-carrier data unit is scheduled with the single OFDMA sub-carrier as the granularity.

Alternatively, the scheduling is performed between the OFDMA sub-carrier data units formed by the same number of OFDMA sub-carriers.

The scheduling of the OFDMA sub-carrier data unit with the single OFDMA sub-carrier as the granularity may include:

The OFDMA sub-carrier of which an input frequency is a first frequency is scheduled to an OFDMA sub-carrier of which an output frequency is the first frequency.

Alternatively, the frequency of the OFDMA sub-carrier of which the input frequency is the first frequency is changed to a second frequency, and then the OFDMA sub-carrier with frequency changed is scheduled to an OFDMA sub-carrier of which the output frequency is the second frequency.

The scheduling between the OFDMA sub-carrier data units formed by the same number of OFDMA sub-carriers may include:

The OFDMA sub-carrier data unit of which an input frequency band is a first frequency band is scheduled to an OFDMA sub-carrier data unit of which an output frequency band is the first frequency band.

Alternatively, the frequency of the OFDMA sub-carrier data unit of which the input frequency band is the first frequency band is changed to a second frequency band, and then the OFDMA sub-carrier data unit with frequency band changed is scheduled to an OFDMA sub-carrier data unit of which the output frequency band is the second frequency band.

Persons of ordinary skill in the art should understand that all or a part of the steps in the method according to the embodiments of the present invention may be implemented by a program instructing relevant hardware, and the program may be stored in a computer readable storage medium. When the program is run, the steps of the method according to the embodiments of the present invention are performed. The storage medium includes a ROM, a RAM, a magnetic disk or an optical disk.

An embodiment of the present invention also provides a data transmission apparatus, which is described in the following embodiment. Since a principle of a solution of the apparatus is similar to the principle of the data transmission method, for the implementation of the apparatus, reference may be made to the method embodiments, and the repeated parts are not described.

Figure 9:
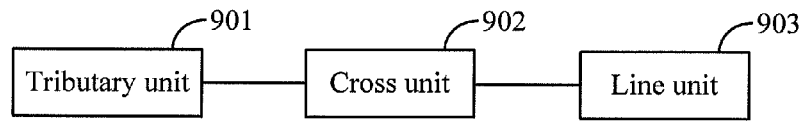
FIG. 9 is a schematic structural diagram of a data transmission apparatus according to an embodiment of the present invention.

As shown in FIG. 9, the data transmission apparatus in the embodiment of the present invention may include:

a tributary unit 901, configured to map a data stream to be transmitted to an OFDMA sub-carrier;

a cross unit 902, configured to schedule the OFDMA sub-carrier from the tributary unit to a line unit; and The line unit 903 is configured to perform multiplexing processing on the OFDMA sub-carrier to generate an OFDMA frame; and transmit the OFDMA frame.

Figure 10:
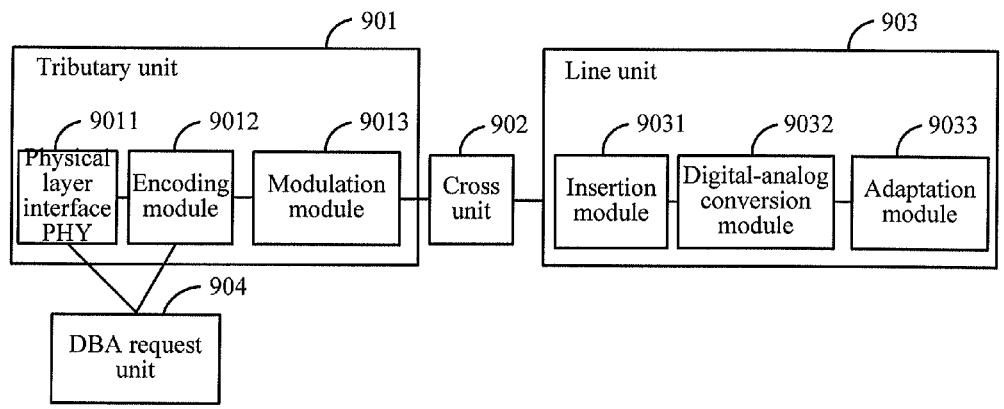
FIG. 10 is a schematic diagram of specific implementation of a data transmission apparatus according to an embodiment of the present invention.

FIG. 10 shows specific implementation of the data transmission apparatus shown in FIG. 9. As shown in FIG. 9, in an embodiment, the data transmission apparatus shown in FIG. 9 may further include:

a DBA request unit 904, configured to initiate a DBA request before the tributary unit maps the data stream to be transmitted to the OFDMA sub-carrier, and receive bandwidth allocation information calculated according to the DBA request, service priority and bandwidth resources.

The tributary unit 901 may further be configured to map the data stream to be transmitted to the OFDMA sub-carrier according to the bandwidth allocation information.

In an embodiment, the tributary unit 901 may include;

a physical layer interface PHY 9011, configured to adapt a rate of the data stream to be consistent with a bearer rate of the OFDMA sub-carrier.

In an embodiment, the tributary unit 901 may include:

a encoding module 9012, configured to perform encoding processing on the data stream; and a modulation module 9013, configured to perform IFFT processing on the data stream after the encoding processing, and modulate the data stream onto the OFDMA sub-carrier.

In an embodiment, the tributary unit 901 may further be configured to:

map the data stream to an OFDMA sub-carrier payload unit; and map the OFDMA sub-carrier payload unit to an OFDMA sub-carrier data unit.

In an embodiment, the cross unit 902 may further be configured to:

schedule the OFDMA sub-carrier data unit with a single OFDMA sub-carrier as granularity; or perform the scheduling between the OFDMA sub-carrier data units formed by the same number of OFDMA sub-carriers.

In an embodiment, the scheduling of the OFDMA sub-carrier data unit with the single OFDMA sub-carrier as the granularity may include:

The OFDMA sub-carrier of which an input frequency is a first frequency is scheduled to an OFDMA sub-carrier of which an output frequency is the first frequency.

Alternatively, the frequency of the OFDMA sub-carrier of which the input frequency is the first frequency is changed to a second frequency, and then the OFDMA sub-carrier with frequency changed is scheduled to an OFDMA sub-carrier of which the output frequency is the second frequency.

In an embodiment, the scheduling between the OFDMA sub-carrier data units formed by the same number of OFDMA sub-carriers may include:

The OFDMA sub-carrier data unit of which an input frequency band is a first frequency band is scheduled to an OFDMA sub-carrier data unit of which an output frequency band is the first frequency band.

Alternatively, the frequency band of the OFDMA sub-carrier data unit of which the input frequency band is the first frequency band is changed to a second frequency band, and then the sub-carrier data unit with frequency band changed is scheduled to an OFDMA sub-carrier data unit of which the output frequency band is the second frequency band.

In an embodiment, the line unit 903 may further be configured to:

multiplex multiple OFDMA sub-carrier data units including one payload sub-carrier into an OFDMA sub-carrier data unit including multiple payload sub-carriers; and multiplex multiple OFDMA sub-carrier data units including multiple payload sub-carriers into an OFDMA channel group through sub-carrier superposition.

In an embodiment, the line unit 903 may include:

a insertion module 9031, configured to insert a cycle prefix or a frame interval in an OFDMA frame after generating the OFDMA frame; and a digital-analog conversion module 9032, configured to perform digital-analog conversion processing on the OFDMA frame after the insertion of the cycle prefix or the frame interval, before transmitting the OFDMA frame.

In an embodiment, the line unit 903 may include:

an adaptation module 9033, configured to adapt the OFDMA frame into an optical channel or a microwave channel for transmission.

Figure 11:
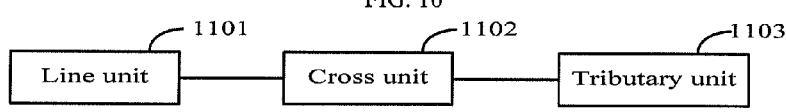
FIG. 11 is a schematic structural diagram of a data receiving apparatus according to an embodiment of the present invention.

An embodiment of the present invention further provides a data receiving apparatus, and as shown in FIG. 11, the apparatus may include:

a line unit 1101, configured to receive an OFDMA frame, and perform digital filtering processing on the OFDMA frame to obtain an OFDMA sub-carrier;

a cross unit 1102, configured to schedule the OFDMA sub-carrier from the line unit to the tributary unit, and a tributary unit 1103, configured to perform demapping processing on the OFDMA sub-carrier to restore an original data stream, and transmit the original data stream to a user network.

Figure 12:
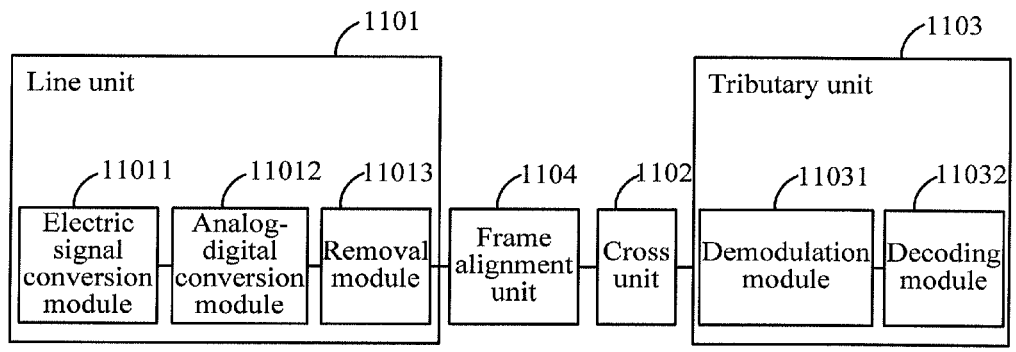
FIG. 12 is a schematic diagram of specific implementation of a data receiving apparatus according to an embodiment of the present invention.

FIG. 12 shows specific implementation of the data receiving apparatus as shown in FIG. 11. As shown in FIG. 11, in an embodiment, the line unit 1101 may include:

an electric signal conversion module 11011, configured to convert a received OFDMA frame transmitted by an optical channel or a microwave channel into an electric signal.

In an embodiment, the line unit 1101 may further include:

an analog-digital conversion module 11012, configured to perform analog-digital conversion processing, after the electric signal conversion module converts the received OFDMA frame into the electric signal; and a removal module 11013, configured to remove a cycle prefix or a frame interval in the OFDMA frame after the analog-digital conversion processing, before digital filtering processing is performed on the OFDMA frame.

In an embodiment, the data receiving apparatus as shown in FIG. 11 may further include:

a frame alignment unit 1104, configured to perform frame alignment processing on the OFDMA frame, before the OFDMA sub-carrier is scheduled.

In an embodiment, the cross unit 1102 may further be configured to:

schedule an OFDMA sub-carrier data unit with a single OFDMA sub-carrier as granularity; or perform the scheduling between the OFDMA sub-carrier data units formed by the same number of OFDMA sub-carriers.

In an embodiment, the scheduling of the OFDMA sub-carrier data unit with the single OFDMA sub-carrier as the granularity may include:

The OFDMA sub-carrier of which an input frequency is a first frequency is scheduled to an OFDMA sub-carrier of which an output frequency is the first frequency.

Alternatively, the frequency of the OFDMA sub-carrier of which the input frequency is the first frequency is changed to a second frequency, and then the OFDMA sub-carrier with frequency changed is scheduled to an OFDMA sub-carrier of which the output frequency is the second frequency.

In an embodiment, the scheduling between the OFDMA sub-carrier data units formed by the same number of OFDMA sub-carriers may include:

The OFDMA sub-carrier data unit of which an input frequency band is a first frequency band is scheduled to an OFDMA sub-carrier data unit of which an output frequency band is the first frequency band.

Alternatively, the frequency band of the OFDMA sub-carrier data unit of which the input frequency band is the first frequency band is changed to a second frequency band, and then the OFDMA sub-carrier data unit with frequency band changed is scheduled to an OFDMA sub-carrier data unit of which the output frequency band is the second frequency band.

In an embodiment, the tributary unit 1103 may include:
a demodulation module 11031, configured to perform FFT processing on the OFDMA sub-carrier;
a decoding module 11032, configured to perform decoding processing on the OFDMA sub-carrier after the FFT processing.

Figure 13:
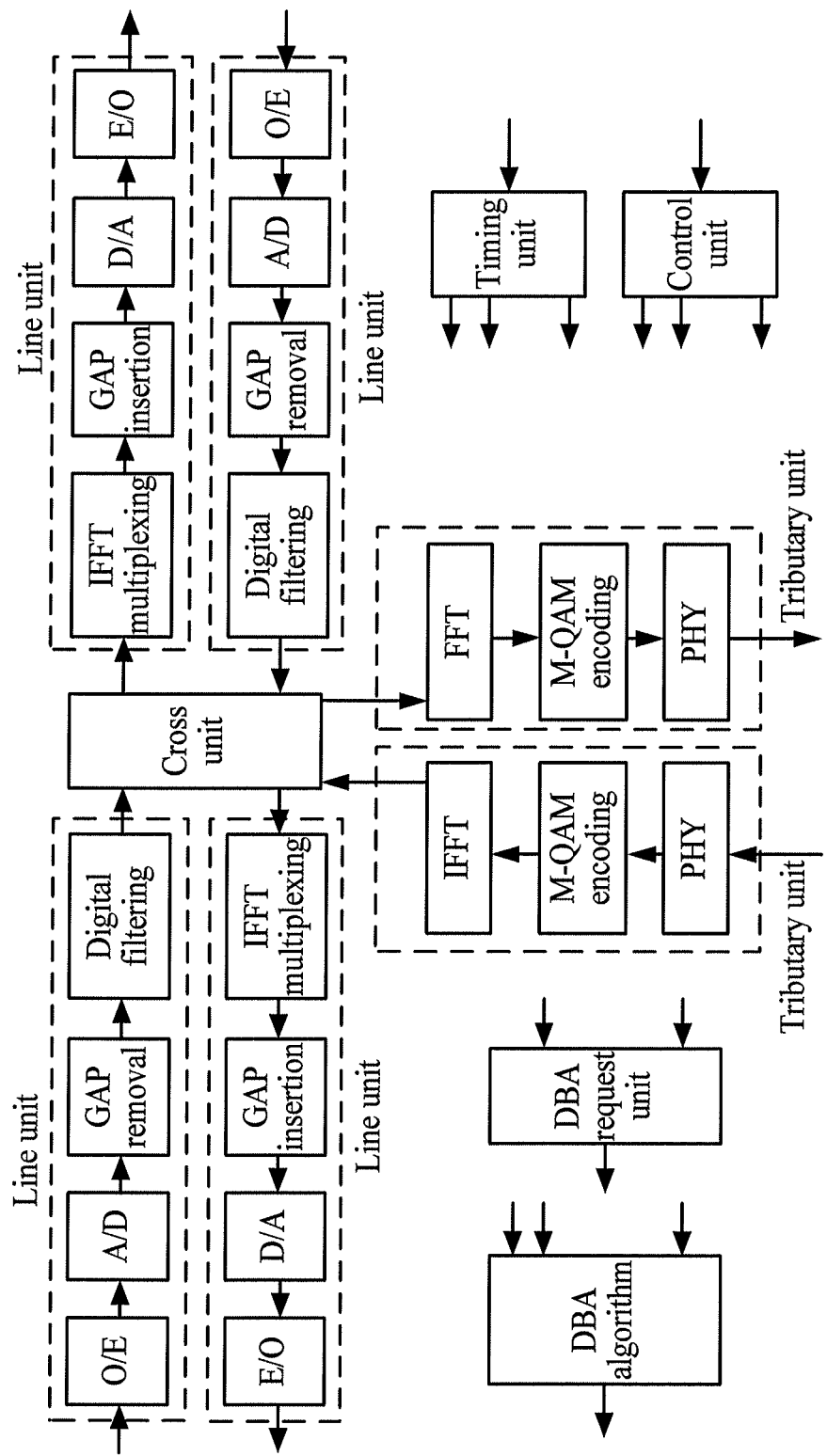
FIG. 13 is a schematic diagram of a data transmission network element according to an embodiment of the present invention.

A specific example is taken in the following to illustrate the specific implementation of the data transmission apparatus as shown in FIG. 9 and the data receiving apparatus as shown in FIG. 11. As shown in FIG. 13, in this embodiment, a data transmission network element is used to implement functions of the data transmission apparatus as shown in FIG. 9 and the data receiving apparatus as shown in FIG. 11, where the data transmission network element is formed by several portions, including a line unit (which implements the functions of the line units 903 and 1101), a cross unit (which implements the functions of the cross units 902 and 1102), a tributary unit (which implements the functions of the tributary units 901 and 1101), a timing unit and a control unit.

The tributary unit in this embodiment includes an externally connected physical layer interface PHY (which implements the functions of the physical layer interface PHY 9011 and the electric signal conversion module 11011), an M-QAM encoding and decoding portion (which implements the functions of the encoding module 9012 and the decoding module 11032) and an IFFT/FFT portion (which implements the functions of the modulation module 9013 and the demodulation module 11031), and is configured to implement a mapping and demapping process of a client signal, where the process includes the following. An FE/GE signal from a client network undergoes PHY processing, and reaches the M-QAM encoding portion to undergo encoding processing, and then is modulated onto the allocated sub-carrier through the IFFT modulation, and afterwards is transmitted to the cross unit. The process is a mapping process. Alternatively, a sub-carrier signal transmitted from the cross unit undergoes FFT processing, and is transmitted to M-QAM for further decoding, and then the FE/GE signal is restored and is transmitted to the client network through the PHY portion. The process is a demapping process.

The cross unit mainly completes the scheduling function based on the OFDMA sub-carrier, which may be scheduling based on a single OFDMA sub-carrier or scheduling based on multiple sub-carriers, and the minimum scheduling granularity is a single OFDMA sub-carrier. The function of the cross unit is to schedule an OFDMA sub-carrier signal from the tributary to the corresponding line unit, or schedule an OFDMA sub-carrier signal from the line unit to the corresponding tributary unit, or perform intermediate scheduling processing, for example, schedule an OFDMA sub-carrier of line unit 1 to line unit 2, or schedule an OFDMA signal of tributary unit 1 to tributary unit 2.

The line unit includes a digital filtering/IFFT multiplexing portion, a GAP insertion (which implements the functions of the insertion module 9031) and insertion removal (which implements the functions of the removal module 11013) portion, a D/A (which implements the functions of the digital-analog conversion module 9032) and A/D (which implements the functions of the analog-digital conversion module 11012) portion, and an O/E (which implements the functions of the electric signal conversion module 11011) and E/O (which implements the functions of the adaptation module 9033) optical interface portion, and mainly completes the following. The sub-carrier transmitted from the cross unit is multiplexed through IFFT multiplexing into an OFDMA line frame format, as shown in FIG. 4, and then undergoes D/A conversion and E/O conversion modulation and is transmitted to a destination network element node, or the optical signal from other network elements is converted into the electric signal, which is processed through an A/D converter and digital filtering and transmitted to the cross unit.

The data transmission network element shown in FIG. 13 may further include a DBA request unit (which implements the functions of the DBA request unit 904), configured to collect traffic data detected in the PHY portion in each tributary unit, generate the DBA request corresponding to each tributary interface according to the traffic data, insert the request into an overhead sub-carrier, and transmit the overhead sub-carrier to a master node network element for processing.

When the data transmission network element as shown in FIG. 13 is a master node network element, a structure thereof further includes a DBA algorithm unit, configured to receive the DBA request transmitted from each node network element, perform fair bandwidth allocation according to the DBA request, service priority and bandwidth resources, obtain bandwidth allocation information required by each tributary interface of each slave node network element, where the bandwidth allocation information is also referred to as a bandwidth map, which includes information such as the amount and serial numbers of the sub-carriers, and is transmitted to each slave node. Afterwards, each slave node maps the service data stream onto the allocated OFDMA sub-carriers according to the allocated bandwidth map.

The timing unit and the control unit in the data transmission network element shown in FIG. 13 are required by equipment. The timing unit is configured to synchronize with an external clock, and at the same time generate a timing signal required by each unit of the equipment, including generating an OFDMA frame alignment signals, or generating a timing signal required in the IFFT/FFT algorithm. The control unit is responsible for initial configuration management and outward communication management of other units.

It is assumed that 20 100 MBIT/S FE private lines exist, which correspond to 20 LTE base stations, and the transmission needs to be performed through the transmission network formed by the data transmission network elements as shown in FIG. 13, a 2 GBIT/S line capacity is required in total, and a ring network formed by 4 network elements exists, where a DBA algorithm module is configured in the master node network element and a DBA request module is configured in the slave node network element.

In this embodiment, a sampling rate of the A/D converter used in a line card is 1024 MBIT/S, and the specific model is ADC291, and then the modulation bandwidth is 512 Mhz. If N=1024 sub-carriers are used for bearing, the bandwidth of each sub-carrier is 512/1024=0.5 MHz. In consideration of using 64QAM encoding, the spectrum efficiency may reach 6 BIT/HZ. Further in consideration of error correction or other overheads, the actual spectrum efficiency may reach 4 BIT/Hz, and then, 0.5 MHz sub-carrier bandwidth may transmit a 2000 KBIT/S data stream. Therefore, it can be calculated that, one FE data stream needs 50 payload sub-carriers in total. Further in consideration of the overhead, assuming that one sub-carrier is allocated to be the overhead sub-carrier, that is to say, the capacity of an OFDMA-ODUi loading 100M FE is 50+1=51 sub-carriers, the 20 FEs needs 1020 sub-carriers for transmission in total, and the residual sub-carriers may be direct current components.

64 QAM encoding on the tributary may be implemented through large scale FPGA, and the IFFT/FFT may be implemented through a VIRTEX-4IFFT CORE logic.

The digital filtering portion on the line may also be implemented through the FPGA or the VIRTEX-4IFFT CORE logic, and optical devices of O/E and E/O may use GIGABIT ETHERNET optical receiving and transmitting modules at low prices.

The cross unit performs all-digital processing, and therefore, large scale FPGAs or VIRTEX-4IFFT CORE logic are required for implementation.

In the foregoing embodiments, the condition that transmission at a FE maximum peak rate is satisfied is taken into consideration, and the allocation of the sub-carriers is fixed. However, in practice, data traffic in an FE port changes dynamically, and if the sub-carriers are allocated merely in consideration of the maximum traffic, no essential difference exists from the TDM service transmission manner. Therefore, in order to effectively use the line bandwidth, statistical multiplexing is required for 20 FE ports. In this embodiment, the statistical multiplexing process is that, the DBA algorithm module of the master node fairly allocates the bandwidths.

Another advantage of this embodiment is the programmability. Since the IFFT/FFT is the processing based on fast DSP, the sampling rate of the A/D converter may also be changed, the number of the sub-carriers may also be changed, and the QAM encoding system may also be changed, different performance may be achieved by setting different parameters under one hardware condition. For example, when the distance is long, the QAM encoding system may be reduced, or the number of the sub-carriers is decreased to achieve better performance.

To sum up, in the embodiments of the present invention, the data stream to be transmitted is mapped to the OFDMA sub-carrier; the OFDMA sub-carrier is scheduled; the OFDMA sub-carrier is multiplexed to generate the OFDMA frame; and the OFDMA frame is transmitted. Different from the OFDMA frame being superposed in an optical domain on the basis of multi-wavelength in the prior art, the OFDMA frame is processed on the basis of an electric layer, and the multiplexing of the sub-carrier or the channel is performed at the electric layer, which thereby implements a cross connection capability on the basis of the OFDMA sub-carrier, and in this way, not only all convergence services from a slave node to a master node are supported, but also a private line connection between two slave nodes is supported.

In the embodiments of the present invention, the OFDMA frame is received; the digital filtering processing is performed on the OFDMA frame to obtain the OFDMA sub-carrier; the OFDMA sub-carrier is scheduled; and the OFDMA sub-carrier is demapped to restore the original data stream, and the original data stream is transmitted to the user network. Different from the OFDMA frame being superposed in an optical domain on the basis of multi-wavelength in the prior art, the OFDMA frame is processed on the basis of an electric layer, and the demultiplexing of the sub-carrier or the channel is performed at the electric layer, which thereby implements a cross connection capability on the basis of the OFDMA sub-carrier, and in this way, not only all convergence services from a slave node to a master node are supported, but also a private line connection between two slave nodes is supported.

In addition, in the embodiments of the present invention, since the bandwidth of the sub-carrier channel is variable, the sub-carrier is applicable to the transmission of the sub-rate services at any rates.

In the embodiment of the present invention, the improvement is performed on a transmission technology system, and the application of the OFDM technology is not limited on the WDM ring network, while the relation to and the integration with the conventional transmission system are fully considered. The solution provided by the present invention is capable of being integrated with the optical layer and the microwave, and is applicable to microwave transmission, a passive optical network field, a convergence transmission network, a metropolitan transmission network and a backbone transmission network.

In the aspect of flexibility, in the prior art, the capacity of the OFDMA frame has no relation to the number of the wavelengths, so the capacity advantages of multi-wavelength cannot be reflected, and the multi-wavelength is merely for overcoming a beat frequency noise of the receiver, while in the present invention, statistical multiplexing of the DBA is integrated, high flexibility is reflected on the utilization of the single wavelength. If the wavelength OCH is added, wider expansion may be performed according to the wavelength.

The objectives, technical solutions, and beneficial effects of the present invention have been illustrated in further detail through the above specific embodiments. It should be understood that the above descriptions are merely specific embodiments of the present invention, but not intended to limit the protection scope of the present invention. Any modification, equivalent replacements, or improvements made within the spirit and principle of the present invention shall fall within the protection scope of the present invention.

What is claimed is:

1. A data transmission method, comprising:
    mapping a data stream to be transmitted to an orthogonal frequency division multiplexing access, OFDMA, sub-carrier, wherein the mapping a data stream to be transmitted to an OFDMA sub-carrier comprises:
        performing encoding processing on the data stream; and
        performing IFFT processing on the data stream after the encoding processing, and modulating the data stream onto the OFDMA sub-carrier;
    scheduling the OFDMA sub-carrier;
    multiplexing the OFDMA sub-carrier to generate an OFDMA frame; and
    transmitting the OFDMA frame.

2. The method according to claim 1, wherein before the mapping the data stream to be transmitted to the OFDMA sub-carrier, the method further comprises:
    initiating a dynamic bandwidth allocation, DBA, request; and
    receiving bandwidth allocation information according to the DBA request, service priority and bandwidth resources;
    the mapping the data stream to be transmitted to the OFDMA sub-carrier comprises:

mapping the data stream to be transmitted to the OFDMA sub-carrier according to the bandwidth allocation information.

3. The method according to claim 1, wherein the mapping the data stream to be transmitted to the OFDMA sub-carrier comprises:
   mapping the data stream to an OFDMA sub-carrier payload unit; and
   mapping the OFDMA sub-carrier payload unit to an OFDMA sub-carrier data unit.

4. The method according to claim 3, wherein the scheduling the OFDMA sub-carrier comprises:
   scheduling the OFDMA sub-carrier data unit with a single OFDMA sub-carrier as granularity; or
   performing the scheduling between the OFDMA sub-carrier data units formed by a same number of OFDMA sub-carriers.

5. The method according to claim 4, wherein the scheduling the OFDMA sub-carrier data unit with the single OFDMA sub-carrier as the granularity comprises:
   scheduling the OFDMA sub-carrier of which an input frequency is a first frequency to an OFDMA sub-carrier of which an output frequency is the first frequency; or
   changing the frequency of the OFDMA sub-carrier of which the input frequency is the first frequency to a second frequency, and then scheduling the OFDMA sub-carrier with frequency changed to an OFDMA sub-carrier of which the output frequency is the second frequency.

6. The method according to claim 4, wherein the scheduling between the OFDMA sub-carrier data units formed by the same number of the OFDMA sub-carriers comprises:
   scheduling the OFDMA sub-carrier data unit of which an input frequency band is a first frequency band to an OFDMA sub-carrier data unit of which an output frequency band is the first frequency band; or
   changing the frequency band of the OFDMA sub-carrier data unit of which the input frequency band is the first frequency band to a second frequency band, and then scheduling the OFDMA sub-carrier data unit with frequency band changed to an OFDMA sub-carrier data unit of which the output frequency band is the second frequency band.

7. The method according to claim 4, wherein the multiplexing the OFDMA sub-carrier to generate the OFDMA frame comprises:
   multiplexing multiple OFDMA sub-carrier data units comprising one payload sub-carrier into an OFDMA sub-carrier data unit comprising multiple payload sub-carriers; and
   multiplexing multiple OFDMA sub-carrier data units comprising multiple payload sub-carriers after the multiplexing, into an OFDMA channel group through sub-carrier superposition.

8. The method according to claim 1, the transmitting the OFDMA frame comprises:
   adapting the OFDMA frame into an optical channel or a microwave channel for transmission.

9. A data receiving method, comprising:
   receiving an OFDMA frame;
   performing digital filtering processing on the OFDMA frame to obtain an OFDMA sub-carrier, wherein the performing digital filtering processing on the OFDMA frame to obtain an OFDMA sub-carrier comprises:
      performing FFT processing on the OFDMA sub-carrier; and
      performing decoding processing on the OFDMA sub-carrier after the FFT processing;
   scheduling the OFDMA sub-carrier; and
   demapping the OFDMA sub-carrier to restore an original data stream, and transmitting the original data stream to a user network.

10. The method according to claim 9, wherein before the scheduling the OFDMA sub-carrier, the method further comprises:
   performing frame alignment processing on the OFDMA frame.

11. A data transmission apparatus, comprising:
   a tributary unit, configured to map a data stream to be transmitted to an OFDMA sub-carrier;
   a cross unit, configured to schedule the OFDMA sub-carrier from the tributary unit to a line unit; and
   the line unit, configured to perform multiplexing processing on the OFDMA sub-carrier to generate an OFDMA frame; and transmit the OFDMA frame.

12. The apparatus according to claim 11, further comprising:
   a DBA request unit, configured to initiate a DBA request before the tributary unit maps the data stream to be transmitted to the OFDMA sub-carrier, and receive bandwidth allocation information calculated according to the DBA request, service priority and bandwidth resources; wherein
   the tributary unit is further configured to map the data stream to be transmitted to the OFDMA sub-carrier according to the bandwidth allocation information.

13. The apparatus according to claim 11, wherein the tributary unit is further configured to:
   map the data stream to an OFDMA sub-carrier payload unit, and
   map the OFDMA sub-carrier payload unit to an OFDMA sub-carrier data unit.

14. The apparatus according to claim 13, wherein the cross unit is further configured to:
   schedule the OFDMA sub-carrier data unit with a single OFDMA sub-carrier as granularity; or
   perform the scheduling between the OFDMA sub-carrier data units formed by a same number of OFDMA sub-carriers.

15. The apparatus according to claim 14, wherein the scheduling the OFDMA sub-carrier data unit with the single OFDMA sub-carrier as the granularity comprises:
   scheduling the OFDMA sub-carrier of which an input frequency is a first frequency to an OFDMA sub-carrier of which an output frequency is the first frequency; or
   changing the frequency of the OFDMA sub-carrier of which the input frequency is the first frequency to a second frequency, and then scheduling the OFDMA sub-carrier with frequency changed to an OFDMA sub-carrier of which the output frequency is the second frequency.

16. The apparatus according to claim 14, wherein the scheduling between the OFDMA sub-carrier data units formed by the same number of OFDMA sub-carriers comprises:
   scheduling the OFDMA sub-carrier data unit of which an input frequency band is a first frequency band to an OFDMA sub-carrier data unit of which an output frequency band is the first frequency band; or
   changing the frequency band of the OFDMA sub-carrier data unit of which the input frequency band is the first frequency band to a second frequency band, and then scheduling the OFDMA sub-carrier data unit with frequency band changed to an OFDMA sub-carrier data unit of which the output frequency band is the second frequency band.

17. The apparatus according to claim 14, wherein the line unit is further configured to:
multiplex multiple OFDMA sub-carrier data units comprising one payload sub-carrier into OFDMA sub-carrier data units comprising multiple payload sub-carriers; and
multiplex multiple OFDMA sub-carrier data units comprising multiple payload sub-carriers after the multiplexing, into an OFDMA channel group through sub-carrier superposition.

18. The apparatus according to claim 11, wherein the line unit further comprises:
an adaptation module, configured to adapt the OFDMA frame into an optical channel or a microwave channel for transmission.

19. A data receiving apparatus, comprising:
a line unit, configured to receive an OFDMA frame, and perform digital filtering processing on the OFDMA frame to obtain an OFDMA sub-carrier;
a cross unit, configured to schedule the OFDMA sub-carrier from the line unit to a tributary unit; and
the tributary unit, configured to perform demapping processing on the OFDMA sub-carrier to restore an original data stream, and transmit the original data stream to a user network.

20. The apparatus according to claim 19, further comprising:
a frame alignment unit, configured to perform frame alignment processing on the OFDMA frame before scheduling the OFDMA sub-carrier.

21. The apparatus according to claim 19, wherein the tributary unit comprises:
a demodulation module, configured to perform FFT processing on the OFDMA sub-carrier; and
a decoding module, configured to perform decoding processing on the OFDMA sub-carrier after the FFT processing.

* * * * *